WILLIAM PAINTER.
Gauge Cock for Steam Boilers.
No. 122,847. Patented Jan. 16, 1872.
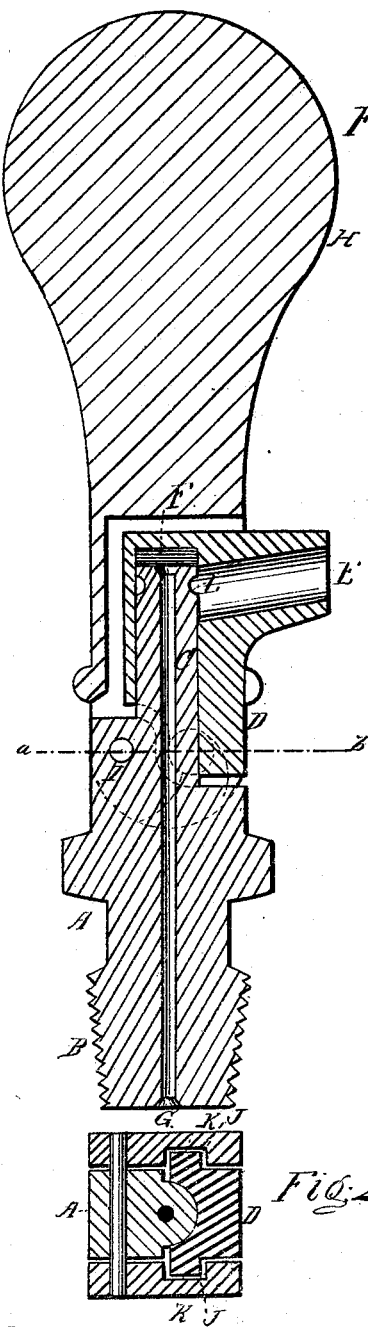
Fig. 1.
Fig. 2.
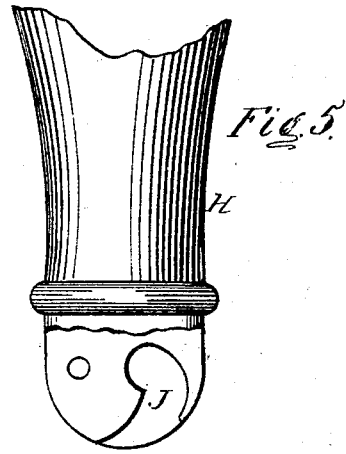
Fig. 5.
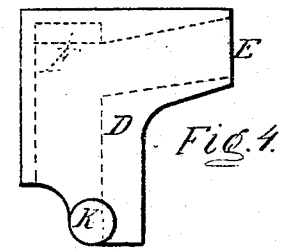
Fig. 4.
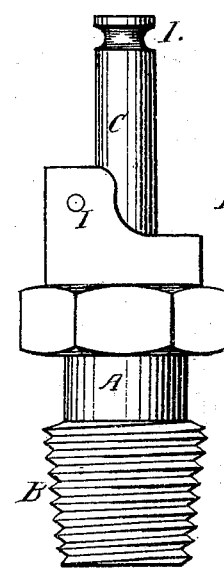
Fig. 3.
Witnesses.
Lewis R. Kenzie
James L. Marrill
Inventor
William Painter

UNITED STATES PATENT OFFICE.

WILLIAM PAINTER, OF BALTIMORE, MARYLAND, ASSIGNOR OF ONE-HALF HIS RIGHT TO LEWIS R. KEIZER, OF SAME PLACE.

IMPROVEMENT IN GAUGE-COCKS FOR STEAM-BOILERS.

Specification forming part of Letters Patent No. 122,847, dated January 16, 1872.

Specification describing certain Improvements in Gauge-Cocks for Steam-Boilers, invented by WILLIAM PAINTER, of Baltimore, Maryland.

My invention has for its object the construction of a gauge or try cock for steam-boilers that is simple in construction, efficient, durable, and easily repaired; and consists in the use of a hollow sliding sleeve fitting the barrel of the cock, and proved with a gasket of rubber or other material that is held against the valve-seat by means of a weight acting upon the sliding sleeve.

In the accompanying drawing, Figure 1 is a vertical section of the cock complete; Fig. 2, a transverse section through line $a\ b$; Fig. 3, an elevation of the barrel. Fig. 4, same view of sliding sleeve and nozzle. Fig. 5 is an elevation of a portion of the weight with one of its jaws broken away, showing the cam-groove that actuates the sliding sleeve.

Referring to the drawing, A represents the barrel of the cock with screw B for attaching it to the boiler in the usual manner. The front portion C is cylindrical, and fitting closely upon it is the sliding sleeve D, with nozzle E for directing the steam or water. F is a gasket of rubber or other material, fitting a recess in the hollow sleeve. This recess is just deep enough to hold the gasket, which, being surrounded on all sides, effectually resists the pressure upon it. It is, therefore, rendered very durable. G is a hole passing through the barrel, and is closed by the gasket F, which is held against the end of the barrel by the pressure of a weight, H, pivoted to the barrel at I, and having two cam-grooves, J J, engaging with lugs or projections K K on the sliding sleeve. These grooves are of such form as to act upon the lugs both in opening and closing the cock, and also to release their hold upon them when the weight H is raised to a vertical position, allowing the sleeve to be removed for renewing the gasket. Near the end of the barrel is an annular groove, L, communicating with the nozzle E. Its object is to intercept any water or steam that may tend to escape from the space between the end of the barrel and the gasket, when the cock is opened, and direct it into the opening in nozzle, thereby preventing leakage between the barrel of the cock and the sliding sleeve. The escaping steam or water is, therefore, thrown downward in a compact stream. The use of the groove renders a close fit of the sleeve upon the barrel unnecessary. It may, therefore, work freely, at the same time being sufficiently tight to prevent leakage.

It is sometimes desirable to renew the gasket while the boiler is under pressure. This may be readily done by raising the weight to a perpendicular position, (where it will remain,) when the sliding sleeve may be removed, the escape being closed by a plug of wood. The detaching of sleeve from the cock secures great convenience in renewing the gasket, which may be done at leisure. On withdrawing the wooden plug the sleeve may be readily replaced on the barrel while steam or water is escaping.

I am aware that gauge-cocks have been constructed with springs and weights to hold the valves on their seats. Such devices are well known; but, Having described my invention, what I claim, and desire to secure by Letters Patent, is—

1. The sliding sleeve D with its nozzle E and gasket F, in combination with the barrel C having an annular groove, L, and the weight H.

2. The lugs K K and cam-grooves J J for actuating the sliding sleeve, all constructed and operating substantially as described.

WILLIAM PAINTER.

Witnesses:
LEWIS R. KEIZER,
JAMES L. MURRILL.

(148)